Figures 1, 2:
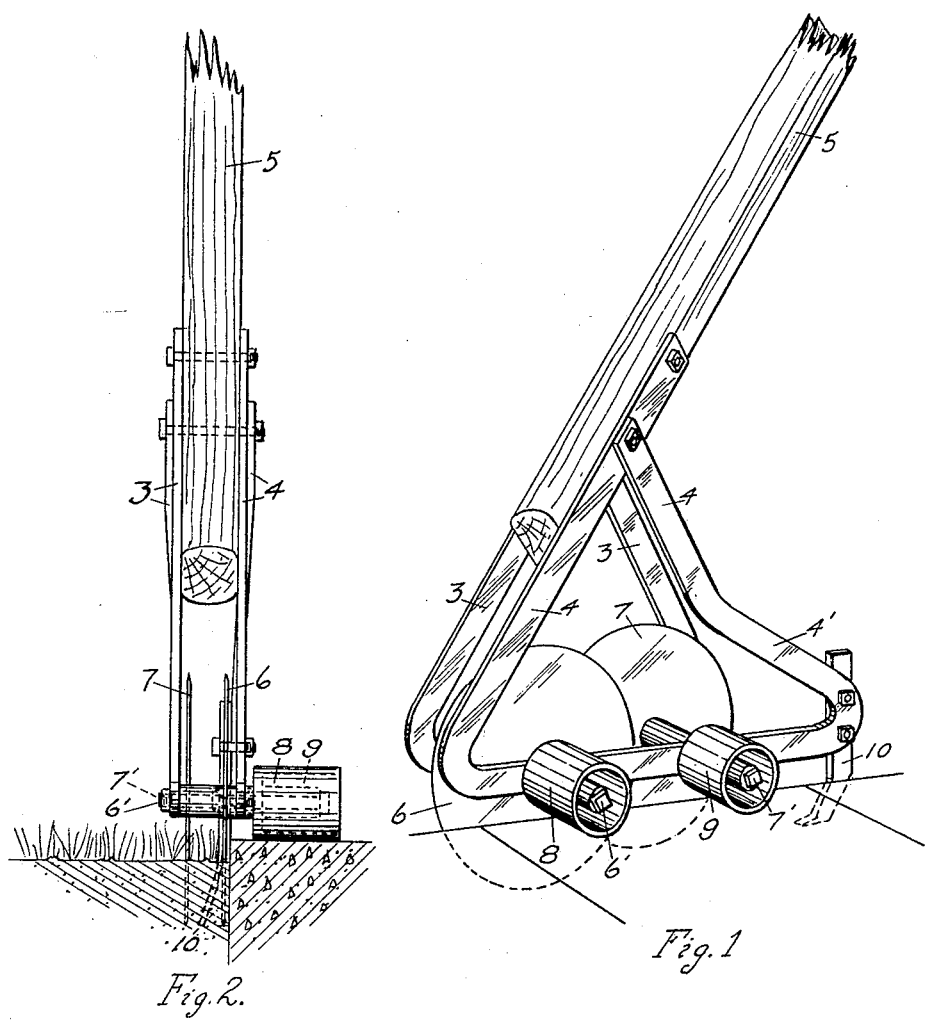

May 3, 1932.　　　J. A. SCHWARZ　　　1,856,435
LAWN EDGER AND GROOVER
Filed Nov. 29, 1929

INVENTOR
Joseph A. Schwarz
BY
ATTORNEY

Patented May 3, 1932

1,856,435

UNITED STATES PATENT OFFICE

JOSEPH A. SCHWARZ, OF LOS ANGELES, CALIFORNIA

LAWN EDGER AND GROOVER

Application filed November 29, 1929. Serial No. 410,389.

My invention relates to a device for cutting out and removing a strip of lawn along next to a walk, whereby to space the edge of the lawn sufficiently from the walk so that the mower will cut over the edge thereof.

Among the salient objects of my invention are: to provide a simple device which can be manually operated and which will in a single operation make two spaced slashes along the edge of a lawn and remove or lift the portion or strip therebetween out of its place for removal therefrom; to provide in a device of the character referred to a handle with supporting frame for the cutter blades so positioned therein that they can be pushed into the earth as said device is pushed along the edge of the lawn; to provide a heel extension for carrying a lifter for lifting the strip of lawn out of its place for removal therefrom; to provide in a device, two spaced cutter blades with bearing rollers or members adapted to run along the edge of the walk, whereby to give a solid bearing and regulate the depth of the cut into the lawn, and, in general, to provide a simple, practical and efficient lawn trimming device of the character referred to.

In order to describe my invention more fully, I have illustrated one form or embodiment thereof on the accompanying sheet of drawings which I will now describe.

Figure 1 is a perspective view of my invention as embodied in a hand machine; and Figure 2 is an end elevation thereof.

Referring in detail to the drawings, two spaced frame members 3 and 4, have secured therebetween a handle 5, inclined for manual operation and having rotatably mounted therebetween two disc cutters 6 and 7, spaced apart and set one rearwardly of the other, substantially as illustrated. Two bearing rollers 8 and 9 are shown on the cutter shafts 6' and 7', said rollers being adapted to run along upon the edge of a walk for the purpose of determining the depth the cutters can go into the soil along side of the walk. The frame member 4 is shown with a heel extension 4', and is provided with a lifter 10, adapted to dip into the ground between the two cuts made by the cutters 6 and 7 and lift the strip of soil therefrom for removal from the lawn.

The rear portions of the frame members 3 and 4, and the heel extension 4', it will be seen are in good position for the foot to be placed thereupon in case the earth is hard and additional force is needed to get the cutters started into it.

It will be noted that with the cutter 7 rearwardly of the forward cutter 6, the overlapping portions of said cutters are moving in opposite directions as said device is moved through the sod, that is, as the rear side of cutter 6 is turning upwardly, the forward half of cutter 7 is moving downwardly, so that the strip therebetween is maintained in its normal position until the lifter 10 cuts under it and lifts it out of its place. The heel 4' extending rearwardly of the other frame member 3, leaves plenty of clearance for the strip to be turned over to the side on top of the lawn.

While I have shown and described one practical embodiment of my invention, I do not limit it to the details of construction and arrangement shown for descriptive purposes, except as I may be limited by the hereto appended claims.

I claim:

In an edger and groover, a supporting frame having two sides, one side of which has a heel portion extended rearwardly, two axially spaced cutter discs rotatably mounted between the said sides of said supporting frame, one cutter being positioned rearwardly of the other, whereby the overlapping portions of the cutter discs turn in opposite directions, a bearing roller at the side of said supporting frame to run upon the edge of a walk, and a lifter member supported by the said heel portion and turned to run under and cut the strip of soil between the cuts made by the discs.

Signed at Los Angeles, Los Angeles County, California, this 22d day of November, 1929.

JOSEPH A. SCHWARZ.